Nov. 9, 1937.  C. AMBRUSTER  2,098,908
STORAGE BATTERY
Filed March 27, 1936  2 Sheets-Sheet 1
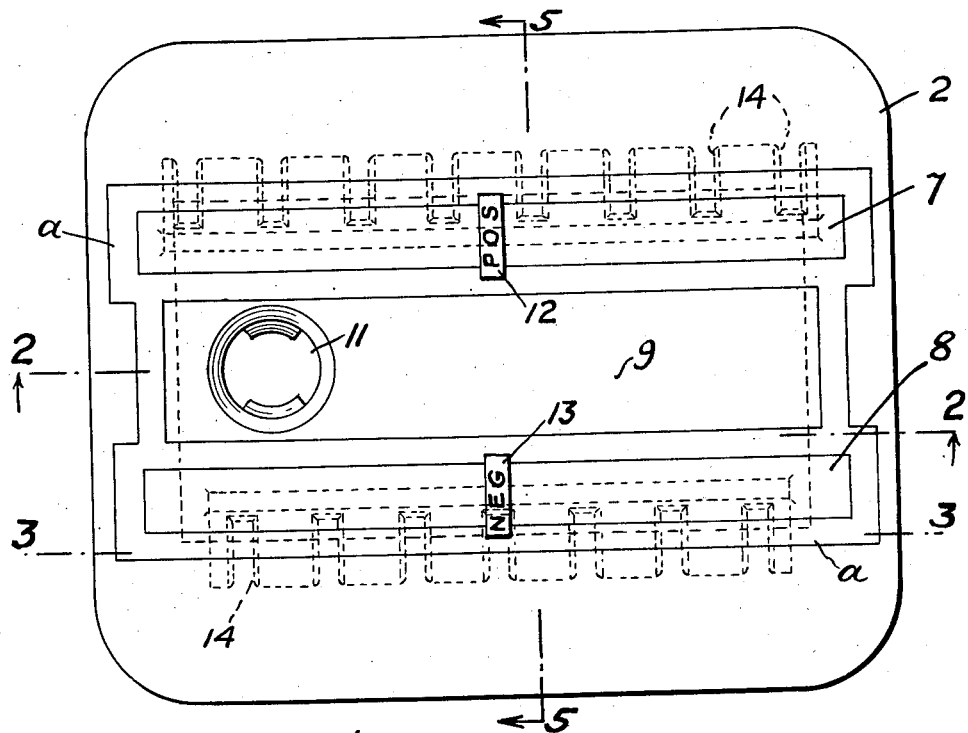
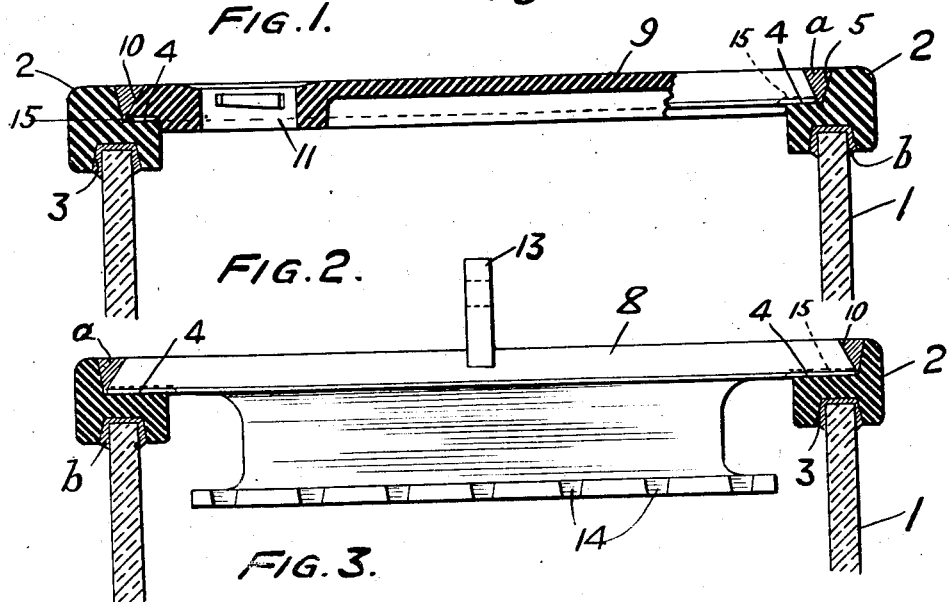
WITNESS:
INVENTOR
Cornelius Ambruster
BY
Augustus B. Stoughton
ATTORNEY.

Nov. 9, 1937.  C. AMBRUSTER  2,098,908

STORAGE BATTERY

Filed March 27, 1936  2 Sheets-Sheet 2

INVENTOR
Cornelius Ambruster
BY
Augustus B. Stoughton
ATTORNEY.

WITNESS:

Patented Nov. 9, 1937

2,098,908

UNITED STATES PATENT OFFICE 2,098,908

STORAGE BATTERY

Cornelius Ambruster, Glenside, Pa., assignor to The Electric Storage Battery Company, Philadelphia, Pa., a corporation of New Jersey Application March 27, 1936, Serial No. 71,269

5 Claims. (Cl. 136—80)

The principal objects of the present invention are to refer the weight of the plate groups to the glass jar wall and in that way permit of the use of a cover of insulating material, such as hard rubber, without overloading it; to avoid capillary spaces of minute caliber under pressure or restraint in the metal terminal parts of the cell or between these parts and the container and its cover, and thus eliminate the corrosion which takes place in such capillary spaces; and to support the plates in such a way that they do not approach the bottom of the jar.

Other objects of the invention will appear from the following description at the end of which the invention will be claimed.

Generally stated, the invention comprises for a storage battery cell, including plate groups and a rectangular container of glass, a cover and plate support comprising a rectangular frame of insulating material seated on the top rim of the container of glass, spaced metallic straps from which the plates are suspended and which span the opening in the rim and rest at their ends on the frame overlying the top rim of the container, with provision at these contact areas for avoiding capillary spaces and for the diffusion and drainage of acid entering these areas from the cell, and a slat or slats of insulating material arranged between the straps and seated on the frame.

The invention also comprises the improvements to be presently described and finally claimed.

Referring to the drawings:

Figure 1 is a top or plan view illustrating features of the invention.

Figs. 2 and 3 are transverse sections taken respectively on the lines 2—2 and 3—3 of Fig. 1.

Figure 4:
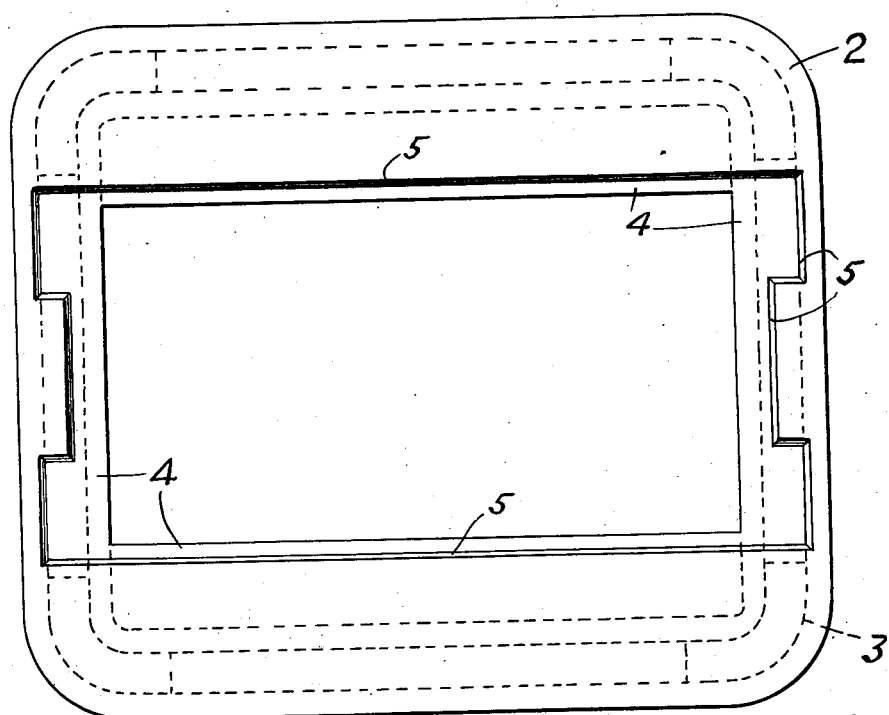
Fig. 4 is a view similar to Fig. 1 but with parts removed or omitted.
Figure 6:
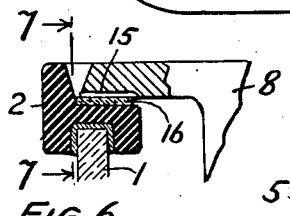
Fig. 6 is a view similar to the left-hand side of Fig. 2 but showing, as a modification, in addition a bearing pad.
Figure 7:
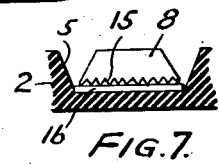
Fig. 7 is a sectional view taken on the line 7—7 of Fig. 6, looking in the direction of the arrows.
Figure 5:
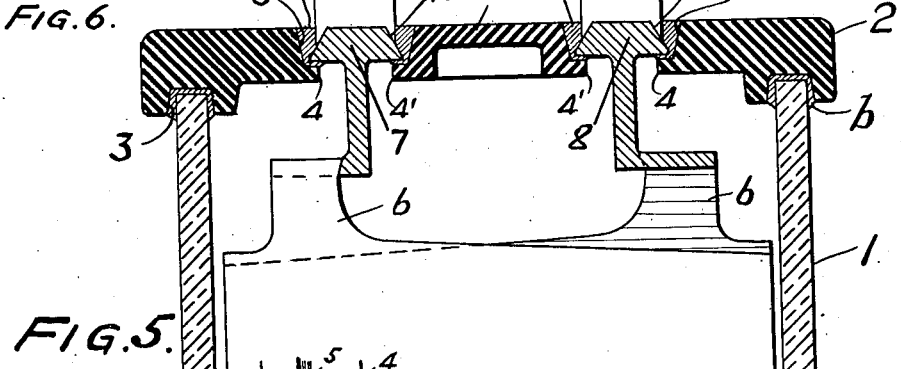
Fig. 5 is a sectional view taken on the line 5—5 of Fig. 1.
Figure 8:
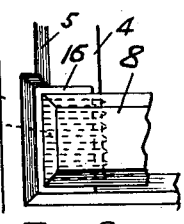
Fig. 8 is a plan view of the construction shown in Figs. 6 and 7.

Referring to the drawings, I is the upstanding wall of a container and the upper edge of this wall defines a substantially rectangular opening. The container may be well constructed of glass and in that case the upstanding wall is rigid and affords a non-yielding support. 2 is a frame of insulating material and it rests upon the upper edge of the wall I. On the under face of the frame there is a marginal groove 3 adapted to receive the upper edge of the wall. Around the central opening of the frame there is a seat 4 and an inclined wall 5. 6 indicates positive and negative plate groups suspended in the container. Each group is provided with a metallic supporting strap 7 and 8 integrally welded or burned to the plates. At their ends the straps rest upon the seats 4—4 in line with the wall I and they span the opening in the frame 2. The detail of the seat 4—4 is shown in Figs. 6, 7 and 8. The underside of the strap ends is fluted with parallel triangular grooves 15 running lengthwise with the strap, and the sharp edges of these flutings rest on the seats 4—4 in such a manner that the weight of the cell element is carried on these edges. There are then no capillary spaces at these contact areas, as the triangular flutings are so proportioned as to provide ample space for the diffusion and drainage of acid which may enter these spaces from the cell. If advisable, a bearing pad 16 of relatively hard non-metallic material, as of glass, may be interposed between the fluted surfaces of the straps and the seats 4—4, to prevent the flutings from deforming the relatively soft material from which the cover frame may be constructed, as of rubber, and thus forming capillary spaces which are undesirable.

The weight of the plate groups is transmitted to the wall I and the frame is subjected only to compressive stress where it lies between the top of the wall and the end of the straps. The straps are spaced apart and the space between them is filled by a slat or closure 9 of insulating material, as rubber. The edges of the straps and of the slat are beveled as at 10 and the beveled walls 10 and 5 provide a groove in which is arranged sealing material $a$. The lateral edges of the slat are provided with lips 4' which underlie the straps 7 and 8. Sealing material or compound $b$ is also arranged in the groove 3 on the under face of the frame 2. The slat or slats 9 may be provided with a filling opening fitting 11. The terminal connections are indicated at 12 and 13 and they are integral or integrally connected with the straps 7 and 8. As shown, the straps 7 and 8 are fitted with grooves 14, and the plates, or more accurately the lugs on the plates, are arranged and burned into the grooves 14.

Inasmuch as the plate groups and their supporting straps and terminal connections are integrally connected, there are no open joints or crevices and no opportunity for such corrosion to occur as takes place in such joints and crevices. Again the weight of the plate groups is supported by metallic straps which are sufficiently rugged to carry it and, therefore, the plate groups do not approach the bottom of the cell as they do when supported from a rubber or like cover, which under their weight yields or deforms.

The foregoing detailed description has been given for clearness of understanding only and no unnecessary limitations should be understood therefrom, but it should be construed as broadly as permissible in view of the prior art.

I claim:

1. For a storage battery cell including plate groups and a rectangular container, a cover and a plate support comprising metal straps spaced inward from the side walls of the container and from which the plate groups are suspended, a rectangular frame of insulating material on the top rim of the container and having marginal portions extending inward from the sides of the container to the straps to provide with the straps a part of the cover, said frame underlying the ends of the straps to support them and the weight of the plate group in line with the end walls of the receptacle, and insulation filling the space between the straps to complete the receptacle cover.

2. A storage battery cell including plates and a rectangular container, a cover and plate support comprising a rectangular frame of insulating material having on one face a sealing groove adapted to receive the top rim of the container wall and having on the other face an inclined marginal wall defining a counter-sunk flat seat, spaced metallic beveled edge straps from which the plates are suspended and which span the opening in the frame and rest at their ends on said seat overlying the top rim of the wall, and a closure of insulating material arranged between the straps and having a beveled edge and seated on said seat, and sealing compound arranged between the parts.

3. In combination in a storage battery cell, a container having upstanding walls whose upper edges define a substantially rectangular opening, a frame of insulating material resting on the upper edges of the wall and having in its under surface a marginal groove adapted to receive the upper edges of the walls, said frame having a central opening and an upstanding peripheral rim, and having a horizontal upper surface between the opening and the rim, a positive and a negative plate group within the container, each of which is provided with a metallic supporting strap integrally welded to the plates, said strap having overhanging portions adapted to rest on the horizontal upper surface of the frame over the upper edges of the container walls whereby the weight of the plate group is transmitted to said walls wholly by compressive stress on the frame, the peripheral edges of said overhanging portions of the strap confronting the upstanding rim of the frame to provide a sealing channel, the straps of the two plate groups being spaced apart, and a closure of insulating material located between the confronting edges of the two straps whose periphery defines with said confronting edges and with the upstanding rim of the frame a sealing groove, and a sealing compound in the grooves surrounding the straps and the closure.

4. The structure, substantially as described in claim 1, and in which the under faces of the strap ends are fluted with parallel grooves triangular in cross-section and ranging lengthwise of the strap, and the sharp edges of these flutes resting on the frame.

5. The structure, substantially as described in claim 1, and in which the frame is provided with seats, and in which the under faces of the strap ends are fluted with parallel grooves triangular in cross-section and ranging lengthwise of the strap, and in which there are provided bearing pads of hard non-metallic material interposed between the flutes and the seats.

CORNELIUS AMBRUSTER.